(12) United States Patent
Kwak et al.

(10) Patent No.: US 11,983,594 B2
(45) Date of Patent: May 14, 2024

(54) CONTACTLESS CARD WITH OPERATOR CONTROLLED STRUCTURE

(71) Applicant: STMICROELECTRONICS ASIA PACIFIC PTE LTD, Singapore (SG)

(72) Inventors: Jaehyun Kwak, Yongin (KR); Kyoung Min Cho, Yongin-si (KR)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 172 days.

(21) Appl. No.: 17/587,645

(22) Filed: Jan. 28, 2022

(65) Prior Publication Data
US 2023/0244899 A1    Aug. 3, 2023

(51) Int. Cl.
G06K 19/077    (2006.01)
G06K 19/073    (2006.01)
H01H 1/12    (2006.01)

(52) U.S. Cl.
CPC . *G06K 19/07749* (2013.01); *G06K 19/07345* (2013.01); *H01H 1/12* (2013.01); *H01H 2231/05* (2013.01)

(58) Field of Classification Search
None
See application file for complete search history.

(56) References Cited

U.S. PATENT DOCUMENTS

| 6,863,220 B2 | 3/2005 | Selker |
| 7,900,843 B2 | 3/2011 | Tanner et al. |
| 2007/0290051 A1 | 12/2007 | Bielmann et al. |
| 2009/0230197 A1 | 9/2009 | Tanner |

FOREIGN PATENT DOCUMENTS

WO    WO 2020/168440 A1    8/2020

*Primary Examiner* — Thomas S McCormack
(74) *Attorney, Agent, or Firm* — Seed IP Law Group LLP

(57) ABSTRACT

The present disclosure is directed to a contactless card including an actuation security structure that is actuated to provide authorization in accessing identifying information on an integrated circuit within the contactless card. In at least one embodiment, the actuation security structure includes a pair of conductive layers and a pair of electrodes. Ends of the pair of conductive layers overlap respective ones of the pair of electrodes. The ends of the pair of conductive layers are at and in a first elastically deformable region and the respective ones of the pair of electrodes are at and in a second elastically deformable region. An owner of the contactless card may provide authorization to access the identification information on the contactless card by applying force to both the first and second elastically deformable regions inward resulting in the ends of the conductive layers moving into electrical communication with the pair of electrodes.

20 Claims, 6 Drawing Sheets

CONTACTLESS CARD WITH OPERATOR CONTROLLED STRUCTURE

BACKGROUND

Technical Field

The present disclosure is directed to contactless cards including an actuation structure for activating a contactless operation of the contactless card.

Description of the Related Art

Generally, cards such as credit cards, debit cards, security access cards, key cards, or some other similar or like type of card may include a contactless structure with an antenna and an integrated circuit within the card. The antenna may emit a signal such as a radio frequency that is detectable by a contactless card scanner. For example, a user of a card with a contactless structure may position the credit card within a sensing region of a contactless card reader to pay for an object or product at the time of purchase or to access a location having limited access. When the user brings the contactless card into close proximity with the contactless card reader and holds the contactless card within a sensing region of the contactless card reader, the contactless card reader (e.g., contactless card scanner) securely authenticates the card's information. This authentication information may be obtained by the contactless card reader through communicating with an antenna within the contactless card that is coupled to an integrated circuit within the contactless card. This integrated circuit may perform cryptography operation and may contain the card's information (e.g., personal identification information, credit card number, card verification code (CVC), security access information, authentication information, or some other similar or like type of identifying information).

However, identify theft may be possible as an individual may be able to obtain identifying information stored on a card with a contactless structure by bringing a contactless card reader into close proximity of the contactless card without the knowledge of an owner of the contactless card. For example, an individual may bring a contactless card reader into a close proximity of a pocket of the owner in which a wallet of the owner is present containing the contactless card. The contactless card reader may then obtain and store the identification information of the contactless card of the owner. The individual who has accessed the identifying information without authorization may then utilize the identifying information to either gain access to a location with limited access or may utilize the identifying information to make unauthorized or unpermitted purchases.

BRIEF SUMMARY

The present disclosure is directed to an actuation structure within a contactless card (e.g., a smart card, security card, credit card, debit card, key card, etc.) that is actuated by a user before identification information of the contactless card may be obtained by a contactless card reader. This actuation of the actuation structure within the contactless card reduces the likelihood of an individual (e.g., a thief, pickpocket, etc.) without permission accessing the identification or authorization information of the contactless card further securing the identification or authorization information from unexpected, unpermitted, or unauthorized access.

In at least one embodiment, a contactless card includes an actuation structure and an integrated circuit both within layers of the contactless card. The integrated circuit may be a radio-frequency identification (RFID) device such as an RFID die, an RFID chip, a secure MCU (microcontroller unit) chip, or some similar or like type of RFID device that may contain identifying information for the contactless card. The RFID device is coupled to a first conductive layer and a second conductive layer of the actuation structure of which both extend through layers of the contactless card. The actuation structure further includes a first electrode spaced apart from a first end of the first conductive layer and a second electrode spaced apart from a second end of the second conductive layer. The first end of the first conductive layer overlaps the first electrode, and the second end of the second conductive layer overlaps the second electrode. The first electrode and the second electrode are spaced apart from each other and are both coupled to a loop antenna within layers of the contactless card. The loop antenna is internally encased within stacked layers of the contactless card. The loop antenna extends around and surrounds the RFID device and the first and second conductive layers.

The first end of the first conductive layer and the second end of the second conductive layer are at and in a first elastically deformable region at a first side of the contactless card, and the first and second electrodes are at and in a second elastically deformable region at a second side of the contactless card. The first and second sides are opposite to each other, and, similarly, the first and second elastically deformable regions are opposite to each other as well.

The actuation structure includes a resting position and an actuated position. When in the resting position, the first and second ends, respectively, are spaced apart from the first and second electrodes, respectively, such that the first and second ends, respectively, do not communicate with the first and second electrodes, respectively. When in the actuated position, the first and second ends, respectively, may physically contact or come into close proximity with the first and second electrodes, respectively, such that the first and second ends, respectively, are in electrical communication (e.g., electrically communicate, electrical couple, etc.) with the first and second electrodes, respectively.

The actuation structure is moved from the resting position to the actuated position by applying force on both the first elastically deformable region and the second elastically deformable region. For example, a user of the contactless card may utilize their fingers to pinch the first and second elastically deformable regions elastically deforming the first and second elastically deformable regions inwards with respect to the first and second sides of the contactless card. The actuation structure may be moved from the actuated position to the resting position by the user releasing the first and second elastically deformable regions resulting in the first and second ends, respectively, no longer being able to communicate with the first and second electrodes, respectively.

When in the resting position, the identification information on the RFID device may not be readily accessible as the loop antenna is not in communication (e.g., electrical communication) with the RFID device. This allows the owner the ability to utilize the contactless card, for example, to purchase an object or product, to gain access to a location of limited access (e.g., only individuals may be permitted access by pre-authorization), or to utilize the contactless card to provide identification information on the contactless card to only individuals permitted access by the owner. In other words, the actuation structure of the contactless card is a form of built in security for the identification information on the card as the actuation structure limits unexpected, unpermitted, or unauthorized access unknown to that of the owner of the contactless card. For example, a thief or an individual trying to obtain the identifying information on the contactless card by bringing a contactless card reader into close proximity of the contactless card will not be able to access the identification information on the contactless card unless the actuation structure is actuated while scanning the contactless card with the contactless card reader. In other words, the thief is not be able to access the identifying information on the contactless card without the owner's permission.

Embodiments of the contactless cards of the present disclosure may be scanned by an RFID scanner or reader that processes the identification, authentication, or authorization information present on the contactless card, which may result in unlocking a lock to gain access to an area with limited accessibility. For example, one such location of limited accessibility or controlled accessibility may be a cabin of a vehicle such as a car, airplane, boat, or some other like or similar vehicle, or a secure location with limited access such as a library, a laboratory, or some other like or similar type of location with limited access. Some alternative locations with limited accessibility or controlled accessibility for security purposes may be a laboratory, a security office, or some other similar or like location.

If the area of limited access is a vehicle, a scanner such as an RFID scanner may be accessible at an external surface of a door of the vehicle and when an embodiment of the contactless card of the present disclosure is brought within proximity of the scanner (e.g., within a scanning region of the scanner) and the actuation structure is fully actuated, the RFID scanner scans the contactless card and unlocks the door of the car providing access to a cabin of the vehicle through the unlocked door.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify the same or similar elements or acts unless the context indicates otherwise. The sizes and relative proportions of the elements in the drawings are not necessarily drawn to scale. For example, some of these elements may be enlarged and positioned to improve drawing legibility.

DETAILED DESCRIPTION

Figure 1A:
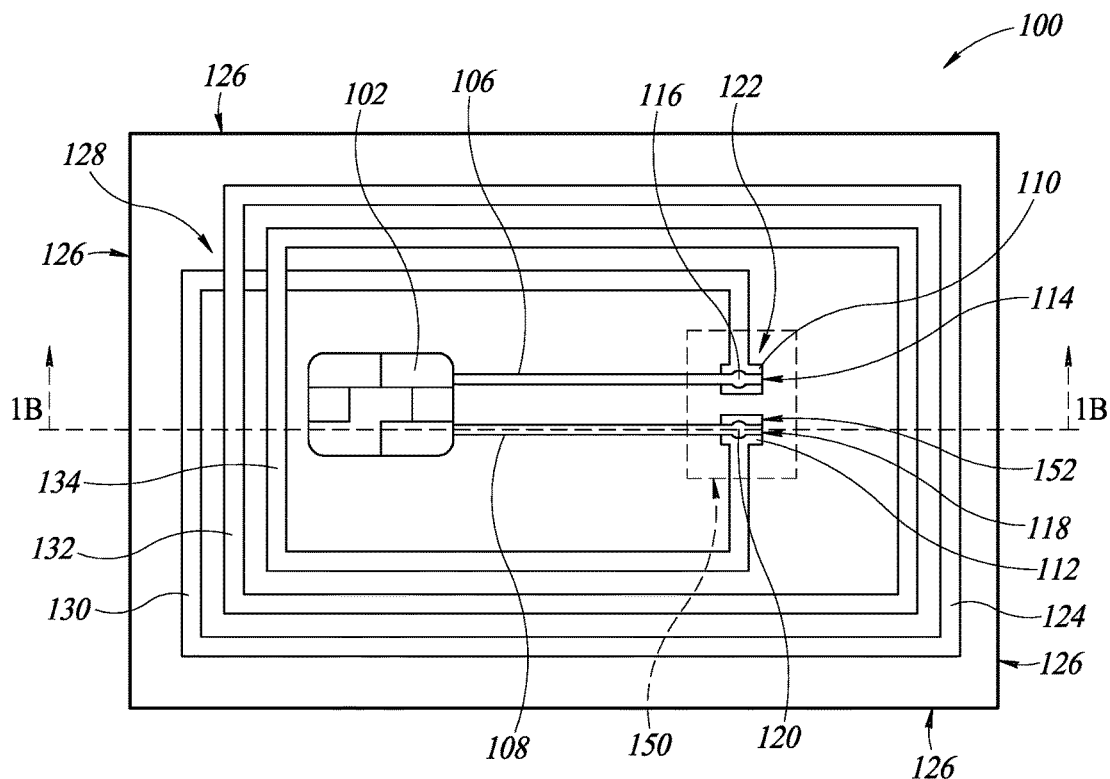
FIG. 1A is a top plan, schematic view of an embodiment of a contactless card of the present disclosure.

In the following description, certain specific details are set forth in order to provide a thorough understanding of various embodiments of the disclosure. However, one skilled in the art will understand that the disclosure may be practiced without these specific details. In other instances, well-known structures associated with electronic security components, electronic security devices, security key cards, or credit/debit card fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, etc., does not necessarily imply a ranked sense of order, but rather may only distinguish between multiple instances of an act or a similar structure or material.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "bottom," "left," and "right," are used for only discussion purposes based on the orientation of the components in the discussion of the figures in the present disclosure as follows. These terms are not limiting as to the possible positions explicitly disclosed, implicitly disclosed, or inherently disclosed in the present disclosure.

The term "substantially" is used to clarify that there may be slight differences and variations when a package is manufactured in the real world, as nothing can be made perfectly equal or perfectly the same. In other words, "substantially" means and represents that there may be some slight variation in actual practice and instead is made or manufactured within selected tolerances.

As used in this specification and the appended claims, the singular forms "a," "an," and "the" include plural referents unless the content clearly dictates otherwise.

While an embodiment of a contactless card and an embodiment of a contactless device is shown and described within the present disclosure, it will be readily appreciated that embodiments are not limited thereto. In various embodiments, the structures, devices, methods and the like described herein may be embodied in or otherwise utilized in any suitable type or form of contactless device, and may be manufactured utilizing any suitable contactless card, contactless device, and security technologies.

The present disclosure is directed to an actuation structure within a contactless card (e.g., a smart card, security card, credit card, debit card, key card, etc.) that is actuated by a user before identification information of the contactless card may be communicated to a contactless card reader. This actuation of the actuation structure within the contactless card reduces the likelihood of an individual without permission accessing the identification or authorization information of the contactless card further securing the identification or authorization information from unexpected, unpermitted, or unauthorized access. In other words, the actuation structure is a form of built in security that secures the identification or authorization information on the contactless card from being accessed by an individual who does not obtain permission or authorization from the owner of the contactless card to access the identification or authorization information.

In at least one embodiment, a contactless card includes an actuation structure and an integrated circuit both within stacked layers of the contactless card. The integrated circuit may be a radio-frequency identification (RFID) device such as an RFID die, an RFID chip, a secure MCU (microcontroller unit) chip, or some other similar or like type of RFID device that may contain identification or authorization information for the contactless card. The RFID device is coupled to a first conductive layer and a second conductive layer of the actuation structure of which both extend through layers of the contactless card. The actuation structure further includes a first electrode spaced apart from a first end of the first conductive layer and a second electrode spaced apart from a second end of the second conductive layer. The first end of the first conductive layer overlaps the first electrode, and the second end of the second conductive layer overlaps the second electrode. The first electrode and the second electrode are spaced apart from each other and are both coupled to a loop antenna within layers of the contactless card. The loop antenna may is internally encased within the stacked layers of the contactless card. The loop antenna extends around and surrounds the RFID device and the first and second conductive layers.

The first end of the first conductive layer and the second end of the second conductive layer are at and in a first elastically deformable region at a first side of the contactless card, and the first and second electrodes are at and in a second elastically deformable region at a second side of the contactless card. The first and second sides are opposite to each other, and, similarly, the first and second elastically deformable regions are opposite to each other as well.

The actuation structure includes a resting position and an actuated position. When in the resting position, the first and second ends, respectively, are spaced apart from the first and second electrodes, respectively, such that the first and second ends, respectively, do not communicate with the first and second electrodes, respectively. When in the actuated position, the first and second ends, respectively, may physically contact or come into close proximity with the first and second electrodes, respectively, such that the first and second ends, respectively, are in electrical communication (e.g., electrically communicate, electrical couple, etc.) with the first and second electrodes, respectively.

The actuation structure is moved from the resting position to the actuated position by applying force on both the first elastically deformable region and the second elastically deformable region. For example, a user of the contactless card may utilize their fingers to pinch the first and second elastically deformable regions elastically deforming the first and second elastically deformable regions inwards with respect to the first and second sides of the contactless card. The actuation structure may be moved from the actuated position to the resting position by the user releasing the first and second elastically deformable regions resulting in the first and second ends, respectively, no longer being able to communicate with the first and second electrodes, respectively.

When in the resting position, the identification information on the RFID device may not be readily accessible as the loop antenna is not in communication (e.g., electrical communication) with the RFID device. This allows the owner the ability to utilize the contactless card, for example, to purchase an object or product, to gain access to a location of limited access (e.g., only individuals may be permitted access by pre-authorization), or to utilize the contactless card to provide identification information on the contactless card to only individuals permitted access by the owner. The actuation structure of the contactless card is a form of built in security for the identification information on the contactless card as the actuation structure limits unexpected, unpermitted, or unauthorized access unknown to that of the owner to the identification information stored on the contactless card. For example, a thief or an individual trying to obtain the identification information on the contactless card by bringing a contactless card reader into the close proximity of the contactless card will not be able to access the identification information on the contactless card unless the actuation structure is actuated while scanning the contactless card with the contactless reader. In other words, the thief is not be able to access the identification information on the card without the owner's permission.

Figure 1B:
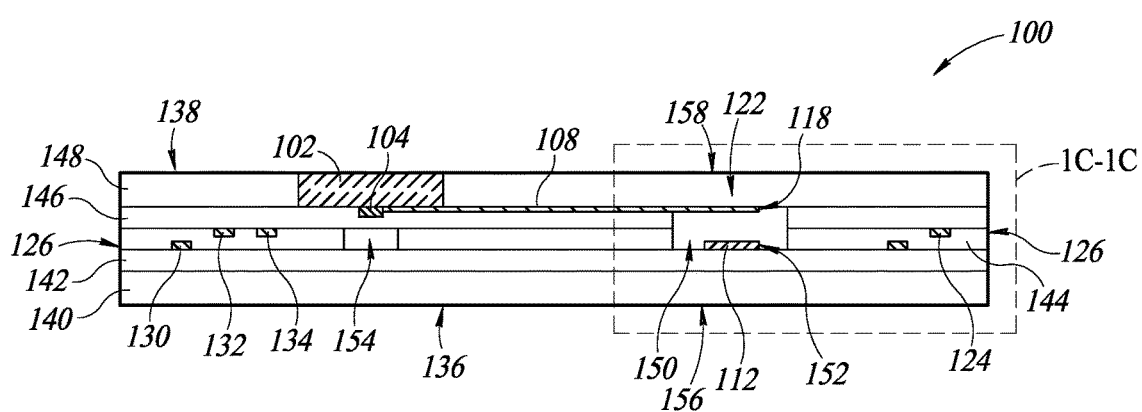
FIG. 1B is a cross-sectional view of the contactless card taken along line 1B-1B as shown in FIG. 1A.

FIG. 1A is a top plan schematic view of an embodiment of a contactless card 100 of the present disclosure. FIG. 1B is a cross-sectional view of the contactless card 100 taken along line 1B-1B as shown in FIG. 1A. As will be readily apparent, some of the features as shown within FIG. 1A are covered by layers of the contactless card 100, however, these features have been shown schematically in the top plan view as shown in FIG. 1A for ease of understanding of these features of the contactless card 100.

As shown in FIG. 1A, the contactless card 100 includes an integrated circuit 102, which may be a radio-frequency identification (RFID) device. For example, the integrated circuit 102 may be an integrated circuit die, an integrated circuit chip, a semiconductor die, a semiconductor chip, an RFID integrated circuit die, an RFID integrated circuit chip, a RFID semiconductor die, an RFID integrated circuit die, a RFID die, an RFID chip, an RFID integrated circuit, a secure MCU chip, or some other type of RFID device. Alternatively, the RFID device may be some other type of frequency device or wireless transmission device utilizing a different type of frequency than radio frequencies. The integrated circuit 102 includes one or more contacts 104 of which one may be more readily seen in FIG. 1B. The one or more contacts 104 extend outward from a surface of the integrated circuit 102 (see FIG. 1B), and the one or more contacts 104 may be referred to as contact pads, electrical contacts, electrical contact pads, or some other type of contacts for coupling to other electrical or conductive layers or structures.

One or more conductive layers 106, 108 are coupled to the integrated circuit 102 and extend away from the integrated circuit 102 to one or more electrodes 110, 112. The one or more conductive layers 106, 108 may be referred to as electrical lines, electrical connections, conductive lines, conductive connections, or some other type of conductive layers extending through the contactless card 100. The one or more electrodes 110, 112 may be referred to as contact pads, electrode pads, contacts, conductive pads, conductive contacts, conductive electrodes, or some other type of conductive layers or conductive electrodes within the contactless card 100.

In this embodiment of the contactless card 100, the one or more conductive layers 106, 108 includes a first conductive layer 106 and a second conductive layer 108. The first conductive layer 106 is coupled to a first one of the one or more contacts 104 and the second conductive layer 108 is coupled to a second one of the one or more contacts 104.

The first conductive layer 106 extends from the first one of the one or more contacts 104 to a first electrode 110 of the pair of electrodes 110, 112. The first conductive layer 106 includes a first end 114 that extends to the first electrode 110 such that the first conductive layer 106 overlaps the first electrode 110. The first conductive layer 106 further includes a contact region 116 that may be relatively wider than other portions of the first conductive layer 106. For example, in this embodiment, the contact region 116 has a substantially circular shape. However, in some embodiments, the contact region 116 may have a square shape, a rectangular shape, an ovular shape, an oval shape, or some other type of shape based on the orientation as shown in FIG. 1A. The functionality and the details of the first conductive layer 106 in use with the first electrode 110 will be discussed in further detail later herein with respect to FIGS. 1C and 1D.

The second conductive layer 108 extends from the second one of the one or more contacts 104 to a second electrode 112 of the pair of electrodes 110, 112. The second conductive layer 108 includes a second end 118 that extends to the second electrode 112 such that the second conductive layer 108 overlaps the second electrode 112. The second conductive layer 108 further includes a contact region 120 similar to the contact region 116 of the first conductive layer 106. The contact region 120 of the second conductive layer 108 may be relatively wider than other portions of the second conductive layer 108. For example, in this embodiment, the contact region 120 has a substantially circular shape. However, in some embodiments, the contact region 120 may have a square shape, a rectangular shape, an ovular shape, an oval shape, or some other type of shape based on the orientation as shown in FIG. 1A. The functionality and the details of the second conductive layer 108 in use with the second electrode 112 will be discussed in further detail later herein with respect to FIGS. 1C and 1D.

An actuation structure 122 includes the contact regions 116, 120 of the first and second conductive layers 106, 108, respectively, and the first and second electrodes 110, 112, respectively. The actuation structure 122 may be referred to as a security structure, a security actuation structure, a limited access structure, a permission structure, an authorization structure, or some other type of structure that may be actuated to access identification or authorization information stored within the integrated circuit 102. Further details of the functionality of the actuation structure 122 will be discussed in further detail later herein with respect to FIGS. 1C and 1D.

The contactless card 100 further includes an antenna 124, for example, a loop antenna, which extends around the integrated circuit 102, around the first and second electrodes 110, 112, and around the first and second conductive layers 106, 108. The antenna 124 may be a conductive layer that spirals and loops around the integrated circuit 102, around the first and second electrodes 110, 112, and around the first and second conductive layers 106, 108 multiple times as shown in FIG. 1A. For example, as the antenna 124 extends through the contactless card 100, the antenna 124 wraps around or loops around the integrated circuit 102, around the first and second electrodes 110, 112, and around the first and second conductive layers 106, 108 multiple times in a rectangular spiral pattern. The antenna 124 is spaced inwardly from peripheral edges, side surfaces, or sidewalls 126 of the contactless card 100 as readily shown in FIG. 1A.

The peripheral edges, side surfaces, or sidewalls 126 may be referred to as outer edges, outer side surfaces, outer sidewalls, external edges, external side surfaces, external sidewalls, or some other type of sidewall or edge at an exterior of the contactless card 100. These peripheral edges, side surfaces, or sidewalls 126 delimit a perimeter of the contactless card 100.

As shown in FIG. 1A, the peripheral sidewalls 126 at the right hand side and the left hand side of the contactless card 100 have a first length that extends from the bottom to the top peripheral sidewalls 126 based on the orientation as shown in FIG. 1A. The peripheral sidewalls 126 at the bottom and top of the contactless card 100 have a second length that extends from the left hand side to the right hand side peripheral sidewalls 126. The first length is less than the second length such that the peripheral sidewalls 126 at the right hand side and the left hand side of the contactless card 100 are shorter than the peripheral sidewalls at the bottom and the top of the contactless card 100 based on the orientation of the contactless card 100 as shown in FIG. 1A. In other words, the contactless card 100 has a rectangular shape based on the orientation of the contactless card 100 as shown in FIG. 1A. For example, the contactless card 100 may be similar in size and shape to a credit card, a debit card, a security card, or some other similar or like type of smart card.

In this embodiment of the contactless card 100, the integrated circuit 102 is closer to the peripheral sidewall 126 at the left hand side of the contactless card 100 based on the orientation of the contactless card 100 as shown in FIG. 1A. In this embodiment of the contactless card 100, the cavity 150 in which the first and second electrodes 110, 112 are present within is closer to the peripheral sidewall 126 at the right hand side of the contactless card 100 based on the orientation of the contactless card 100 as shown in FIG. 1A.

As the antenna 124 extends through the contactless card 100, the antenna 124 overlaps itself at an overlap region 128. A first portion 130 of the antenna 124 at and within the overlap region 128 is at a first level within the contactless card 100. The first portion 130 is overlapped by a second portion 132 of the antenna 124 at and within the overlap region at a second level within the contactless card 100 such that the antenna 124 does not abut itself as looping or wrapping around the integrated circuit 102 and the actuation structure 122. In other words, as the antenna 124 extends through the contactless card 100, the antenna 124 moves upward or gradually upward at some location along the antenna 124 from the first level to the second level based on the orientation of the contactless card 100 in FIG. 1B. As the second portion 132 overlaps the first portion 130 at and in the overlap region 128, the second portion 132 does not physically abut or contact the first portion 130 (e.g., the second portion 132 of the antenna 124 does not physically run into the first portion 130 of the antenna 124). The second portion 132 is spaced apart from the first portion 130 to reduce the likelihood of electrical cross-talk between the first portion 130 and the second portion 132.

In this embodiment of the contactless card 100, the antenna 124 includes a third portion 134 that overlaps the first portion 130 at and in the overlap region 128 in the same or similar fashion as the second portion 132 overlaps the first portion 130 at or in the overlap region 128. Accordingly, for brevity and simplicity of the present disclosure, the details of the third portion 134 overlapping the first portion 130 will not be discussed in further detail herein in view of the above discussion with respect to the second portion 132 overlapping the first portion 130. Similar to the second portion 132, the third portion 134 is spaced apart from the first portion 130 to reduce the likelihood of electrical cross-talk between the first portion 130 and the second portion 132. Similar to the second portion 132, the third portion 134 may be at the second level such as the second portion 132. In some other embodiments, the second and third portions 132, 134 may be at different levels relative to each other.

As shown in FIG. 1B, the contactless card 100 includes a first surface 136 and a second surface 138 that is opposite to the first surface 136. The first and second surfaces 136, 138 may be referred to as outer surfaces, external surfaces, exposed surfaces, or some other type of surface at an exterior of the contactless card 100. A plurality of stacked layers are between the first surface 136 and the second surface 138. The first and second surfaces 136, 138 are transverse to the peripheral sidewalls 126, the first and second surfaces 136, 138 extend between opposite ones of the peripheral sidewalls 126, and the peripheral sidewalls 126 extend between the first and second surfaces 136, 138. In other words, the first and second surfaces 136, 138 are transverse to the peripheral sidewalls 126, and, in some embodiments, the first and second surfaces 136, 138 are perpendicular or substantially perpendicular to the peripheral sidewalls 126.

The plurality of stacked layers include a first layer 140, a second layer 142 on the first layer 140, a third layer 144 on the second layer 142, a fourth layer 146 on the third layer 144, and a fifth layer 148 on the fourth layer 146. In this embodiment, the first layer 140 is separated from the third layer 144 by the second layer 142, and the third layer 144 is separated from the fifth layer 148 by the fourth layer 146. The first, second, third, fourth, and fifth layers 140, 142, 144, 146, 148 each include a respective thickness that extends in a direction directed from the first surface 136 to the second surface 138 of the contactless card 100. For example, the first layer 140 may have a first thickness ranging from 0.150-millimeters (mm) to 0.300-millimeters (mm), the second layer 142 may have a second thickness ranging from 0.050-millimeters (mm) to 0.150-millimeters (mm), the third layer 144 may have a third thickness ranging from 0.050-millimeters (mm) to 0.150-millimeters (mm), the fourth layer 146 may have a fourth thickness ranging from 0.050-millimeters (mm) to 0.150-millimeters (mm), and the fifth layer 148 may have a fifth thickness ranging from 0.150-millimeters (mm) to 0.300-millimeters (mm). The first, second, third, fourth, and fifth thicknesses may be equal to the upper end or the lower end of the ranges as discussed above. In some embodiments, the respective thicknesses of the first, second, third, fourth, and fifth layers 140, 142, 144, 146, 148 may be different than those as set forth above.

The third layer 144 may be referred to as a core layer or a central layer as the third layer is sandwiched between the second and fourth layers 142, 146, respectively. The first and fifth layers 140, 148 may be referred to as external layers, outer layers, or some other similar or like type of layers at an exterior of the contactless card 100. The second, third, and fourth layers 142, 144, 146 may be referred to as internal layers, inner layers or some other similar or like type of layers within the contactless card 100 and between the first and fifth layers 140, 148, respectively. In other words, the second, third, and fourth layers 142, 144, 146 are sandwiched between the first and fifth layers 140, 148 as shown in FIG. 1B.

The third thickness of the third layer 144 may be greater than double the thickness of the antenna 124 such that the second portion 132 and the third portion 134 of the antenna 124 may readily overlap the first portion 130 of the antenna 124 as discussed above. In other words, the third layer 144 may be thick enough such that the second and third portions 132, 134 of the antenna 124 may readily overlap the first portion 130 of the antenna 124 and avoid cross-talk between the first, second, and third portions 130, 132, 134 of the antenna 124.

The first layer 140 may include a polyvinyl chloride (PVC) material. The second layer 142 may be include a polyvinyl chloride (PVC) material or a polyethylene terephthalate (PET) material, the third layer 144 may include a dielectric or insulating material, the fourth layer 146 may include a polyvinyl chloride (PVC) material or a polyethylene terephthalate (PET) material, and the fifth layer may be a polyvinyl chloride (PVC) material. The first, second, third, fourth, and fifth layers 140, 142, 144, 146, 148 may be coupled together by being laminated together while forming the contactless card 100 or by bonding agents between some of the first, second, third, fourth, and fifth layers 140, 142, 144, 146, 148, respectively. Details of an embodiment of a method of manufacturing the contactless card 100 will be discussed in further detail later herein with respect to FIGS. 2A-2E. In other words, the first, second, third, fourth, and fifth layers 140, 142, 144, 146, 148 may each be made of a non-conductive material. The first, second, third, fourth, and fifth layers 140, 142, 144, 146, 148 may be made of an elastically deformable non-conductive material that may be deformed without plastic or permanent deformation.

The antenna 124, the first and second conductive layers 106, 108, and the first and second electrodes 110, 112 may include a conductive material such as a copper material, a silver material, a gold material, a conductive alloy material, or some other similar or like type of conductive material or combination of conductive materials that transmits an electrical signal. The antenna 124, the first and second conductive layers 106, 108, and the first and second electrodes 110, 112 may have respective thicknesses extending in the direction of the first, second, third, fourth, and fifth thicknesses of the first, second, third, fourth, and fifth layers 140, 142, 144, 146, 148. The respective thicknesses of the antenna 124, the first and second conductive layers 106, 108, and the first and second electrodes 110, 112 may range from 0.018-millimeters (mm) to 0.035-millimeters (mm). The thickness of the antenna 124, the first and second conductive layers 106, 108, and the first and second electrodes 110, 112 may be equal to the upper end or to the lower end of the range as discussed above. In some embodiments, the respective thicknesses of the antenna 124, the first and second conductive layers 106, 108, and the first and second electrodes 110, 112 may be different from those as set forth above.

The first and second conductive layers 106, 108 may be made of a conductive elastically deformable material such that the first and second conductive layers 106, 108. In other words, when deformed, the first and second conductive layers 106, 108 do not plastically or permanently deform.

While the following discussion may focus on the second conductive layer 108 and the second electrode 112, it will be readily appreciated that the following discussion of the second conductive layer 108 and the second electrode 112 readily applies to the first conductive layer 106 and the first electrode 110 as shown in FIG. 1A. In other words, the first conductive layer 106 and the first electrode 110 may have the same or similar features, details, and functionalities as those discussed in detail with respect to the second conductive layer 108 and the second electrode 112 with respect to FIGS. 1B, 1C, and 1D.

As shown in FIG. 1B, the second conductive layer 108 is sandwiched between the fourth layer 146 and the fifth layer 148, and the second conductive layer 108 extends from one of the one or more contacts 104 of the integrated circuit 102 into a space 150, which is spaced apart from the integrated circuit 102. The space 150 extends from the second layer 142 through the third and fourth layers 144, 146 to the fifth layer 148. The space 150 contains the second end 118 of the second conductive layer 108 and the second electrode 112. As readily seen in FIG. 1B, the second end 118 of the second conductive layer 108 extends at least to a side surface 152 of the second electrode 112. The side surface 152 is the side surface 152 of the second electrode 112 furthest away from the integrated circuit 102 relative to the other respective side surfaces of the second electrode 112. The second end 118 may be an end surface of the second conductive layer 108 that is substantially coplanar with the side surface 152 of the second electrode 112. Similarly, the first end 114 of the first conductive layer 106 may be an end surface of the first conductive layer 106 substantially coplanar with a respective side surface of the first electrode 110. However, in some alternative embodiments, the second end 118 may extend past the side surface 152 of the second electrode 112, and the first end 114 may extend past the respective side surface of the first electrode 110.

The space 150 may be referred to as a cavity, an inner cavity, an internal cavity, or some other type of cavity that is delimited internally within the contactless card 100. For example, the space 150 is at least partially delimited by the second layer 142, the third layer 144, the fourth layer 146, and the fifth layer 148.

As shown in FIG. 1A, the space 150, which is represented by a dotted line around the first and second electrodes 110, 112 and the first and second ends 114, 118, extends continuously from the second electrode 112 to the first electrode 110 and the first end 114 such that the first and second electrodes 110, 112 and the first and second ends 114, 118 are all within the space 150. In other words, the space 150 extends continuously from the first electrode 110 to the second electrode such that the space contains all of the first electrode 110, the second electrode 112, the first end 114 of the first conductive layer 106, and the second end 118 of the second conductive layer 108.

However, in some alternative embodiments, the space 150 may terminate somewhere between the first and second electrodes 110, 112 at a wall (not shown) of the plurality of stacked layers between the first and second electrodes 110, 112. In these alternative embodiments, the first electrode 110 and the first end 114 are within a first space separated from a second space in which the second electrode 112 and the second end 118 are present (e.g., within). The first space and the second space are separated from each other by the wall (not shown) of the plurality of stacked layers positioned between the first electrode 110 and the second electrode 112. In other words, in these alternative embodiments, the space 150 is replaced with two separate and distinct spaces that are partially or fully delimited from each other by the wall (not shown) of the plurality of stacked layers, and the first space contains the first electrode 110 and the first end 114 whereas the second space contains the second electrode 112 and the second end 118.

A gap 154 (e.g., space, cavity, etc.) is overlapped by the integrated circuit 102. The gap 154 may be present to further electrically isolate the one or more contacts 104 of the integrated circuit 102 from the other conductive structures or layers within the contactless card 100 such as the antenna 124, and, more specifically, the first, second, and third portions 130, 132, 134 of the antenna 124 that loop around the integrated circuit 102. However, in some alternative embodiments, the gap 154 may not be present, and, instead, the third layer 144 may be present such that the third layer extends continuously from the peripheral sidewall 126 at the left-hand side of FIG. 1B to the space 150. The space 150 and the gap 154 may be filled with air. In other words, the gap 154 may be optional such that in some embodiments the gap 154 may be present whereas in alternative embodiment the gap 154 may not be present and may be filled in with the third non-conductive layer 144.

The contactless card 100 includes a first elastically deformable region 156 and a second elastically deformable region 158 opposite to the first elastically deformable region 158. The first and second elastically deformable regions 156, 158 overlap each other. The first elastically deformable region 156 is accessible at the first surface 136 of the contactless card 100, and the second elastically deformable region 158 is accessible at the second surface 138 of the contactless card 100. The first and second electrodes 110, 112 are within and overlapped by the first elastically deformable region 156, and the first and second ends 114, 118 of the first and second conductive layers 106, 108 are within and overlapped by the second elastically deformable region 158. The first elastically region 156 may include the first and second layers 140, 142, and the second elastically deformable region 158 may include the fifth layer 148. The functionality of the first and second elastically deformable regions 156, 158 will be discussed in detail as follows herein with respect to FIGS. 1C and 1D.

Figure 1C:
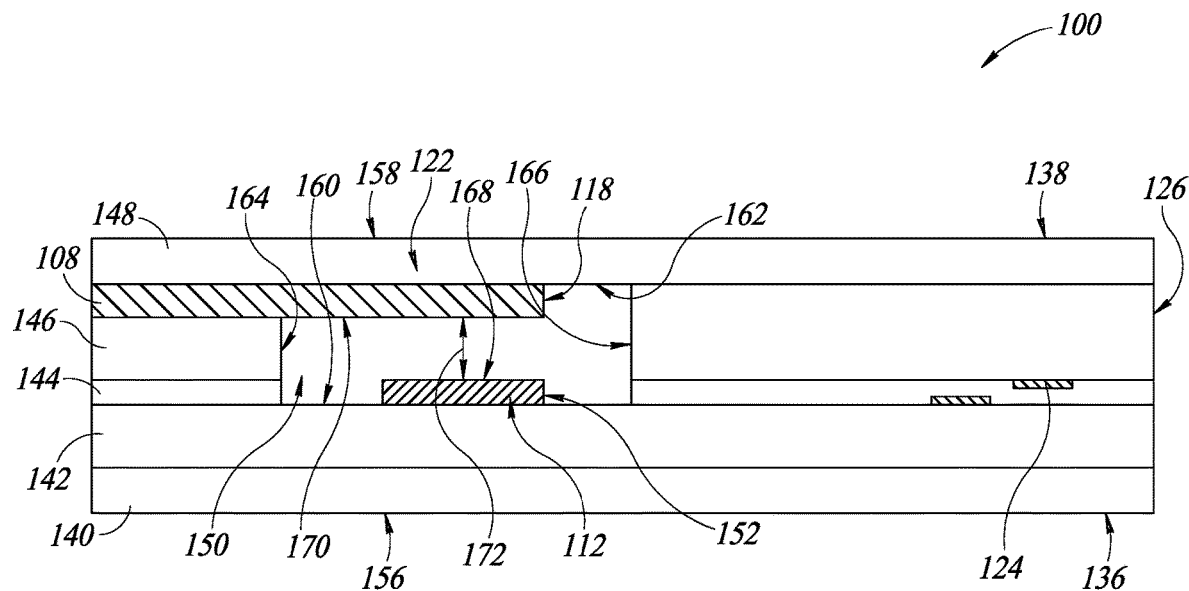
FIG. 1C is a zoomed in, sectional view of the contactless card of section 1C-1C as shown in FIG. 1B when an actuation structure of the contactless card is in a resting position.
Figure 1D:
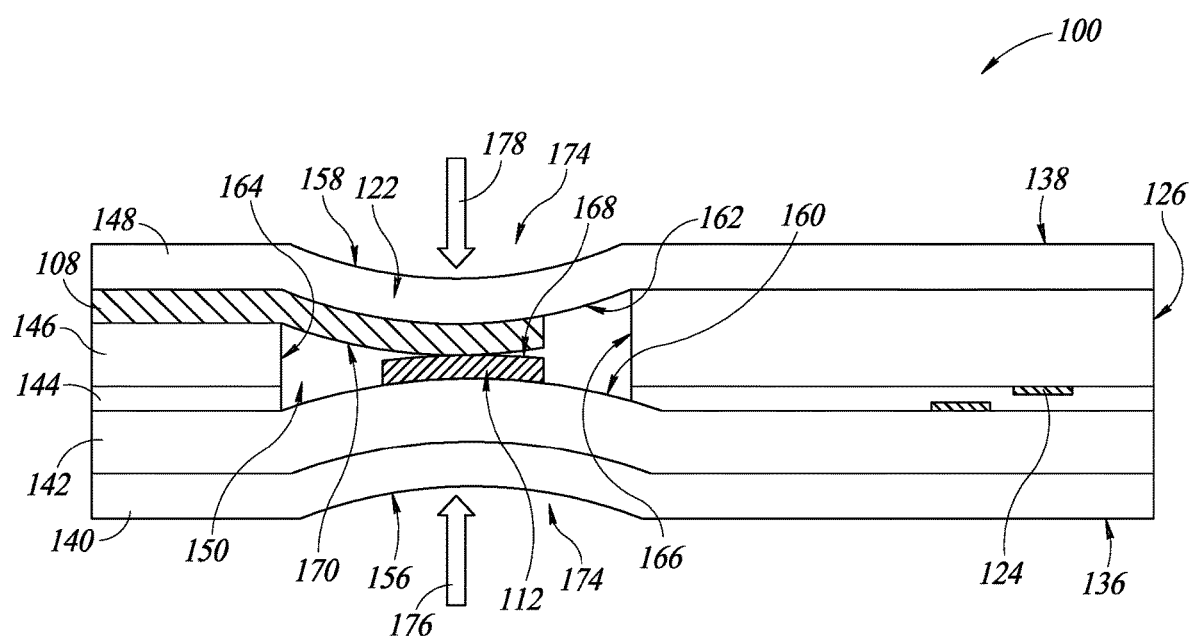
FIG. 1D is a zoomed in, sectional view of the contactless card of section 1C-1C as shown in FIG. 1B when the actuation structure of the contactless card is in an actuated position.

FIGS. 1C and 1D are zoomed in, sectional views of section 1C-1C as represented by the dotted square as shown in FIG. 1B. FIG. 1C shows the contactless card 100 in a resting position or resting state whereas FIG. 1D shows the contactless card 100 in an actuated position or an actuated state. In the resting position as shown in FIG. 1C, identification, authorization, or authentication information contained on the contactless card 100 may not be obtained or accessed by a contactless card reader (not shown). In the actuated position as shown in FIG. 1D, the identification, authorization, or authentication information contained on the contactless card 100 may be obtained or accessed by the contactless card reader (not shown).

As shown in FIG. 1C, the space 150 is delimited by inner surfaces 160, 162 of the second layer 142 and the fifth layer 148, respectively, and is delimited by inner sidewalls 164, 166 including inner side surfaces of the third and fourth layers 144, 146 that are substantially coplanar with each other. The inner surfaces 160, 162 face toward each other, respectively, and the inner sidewalls 164, 166 face toward each other, respectively. The inner sidewalls 164, 166 are spaced inwardly from the peripheral sidewalls 126 of the contactless card 100. The space 150 has an L-shape viewed in the cross-sectional view as shown in FIGS. 1B, 1C, and 1D.

The second electrode 112 includes a surface 168 that faces towards a surface 170 of the second conductive layer 108, and the surface 170 of the second conductive layer 108 faces towards the surface 168 of the second electrode 112. These surfaces 168, 170 of the second electrode 112 and the second conductive layer 108, respectively, may be referred to as contact surfaces that may physically contact or abut each other when the actuation structure 122 is in the actuated position as shown in FIG. 1D. While this discussion is directed to the second electrode 112 and the second conductive layer 108, the first electrode 110 and the first conductive layer 106 may have like or similar surfaces and relationships as these surfaces 168, 170 of the second electrode 112 and the second conductive layer 108, respectively.

As shown in FIG. 1C, the first elastically deformable region 156 and the second elastically deformable region 158 are in resting positions. The resting positions being the position of the first and second elastically deformable regions 156, 158 when no external pressure or force is applied to the first and second surfaces 136, 138 at the first and second elastically deformable regions 156, 158. In this resting position of the contactless card 100, the surface 168 of the second electrode 112 is spaced apart from the surface 170 of the second conductive layer 108 by a dimension 172, which is transverse to the surfaces 168, 170 of the second electrode 112 and the second conductive layer 170, respectively. The dimension 172 may be selected while manufacturing the contactless card 100 such that when the contactless card 100 is in the resting position (e.g., the first and the second elastically deformable regions 156, 158 are not deformed by external pressures or forces) the second conductive layer 108 is electrically isolated from the second electrode 112 by the space 150 due to the dimension 172. In other words, an electrical signal may not readily pass from the surface 168 of the second electrode 112 to the surface 170 of the second conductive layer 108 or vice versa such that identification, authorization, or authentication information may not be readily obtained from the contactless card 100 by a contactless card reader (not shown).

Unlike FIG. 1C in which the contactless card 100 is in the resting position (e.g., non-actuated position), the contactless card 100 is in an actuated position or an actuated state in which the first and second elastically deformable regions 156, 158 are in actuated positions or actuated states as shown in FIG. 1D. In other words, the actuation structure 122 is in the resting position as shown in FIG. 1C, and the actuation structure 122 is in the actuated position as shown in FIG. 1D. When the actuation structure 122 is in the resting position, the first and second elastically deformable regions 156, 158 are relatively flat as compared to when in the actuation structure 122 is in the actuated position as shown in FIG. 1D.

In the actuated positions, the first and second elastically deformable regions 156, 158 are elastically deformed inward (e.g., elastically deflected inward, elastically bent inward, elastically moved inward, etc.) such that the first and second deformable regions 156, 158 have concave surfaces at the first and second surfaces 136, 138, respectively. Oppositely, the inner surfaces 160, 162 of the second and fifth layers 142, 148, respectively, are convex surfaces corresponding to the concave surfaces at the first and second surfaces 136, 138, respectively. In other words, indentations or dimples 174 occur at the first and second surfaces 136, 138 when an external pressure or force, which is represented by the arrows 176, 178 as shown in FIG. 1D, is applied to the first and second elastically deformable regions 156, 158 accessible at the first and second surfaces 136, 138 of the contactless card 100. The external force or pressure may be applied by a pinching force between two oppositely positioned fingers of an owner of the contactless card 100 on the first and second surfaces 136, 138, respectively. For example, a first finger of the owner may be on the first elastically deformable region 156 and a second finger of the owner may be on the second elastically deformable region 158. The first finger applies a first external force 176 to the first elastically deformable region 156 in a first direction while simultaneously applying a second external force 178 to the second elastically deformable region 158 in a second direction opposite to the first direction with the second finger. In other words, the first and second fingers of the owner pinch down onto the first and second elastically deformable regions 156, 158 deforming the first and second elastically deformable regions 156, 158 inward towards an inner central region of the contactless card 100.

Figure 4:
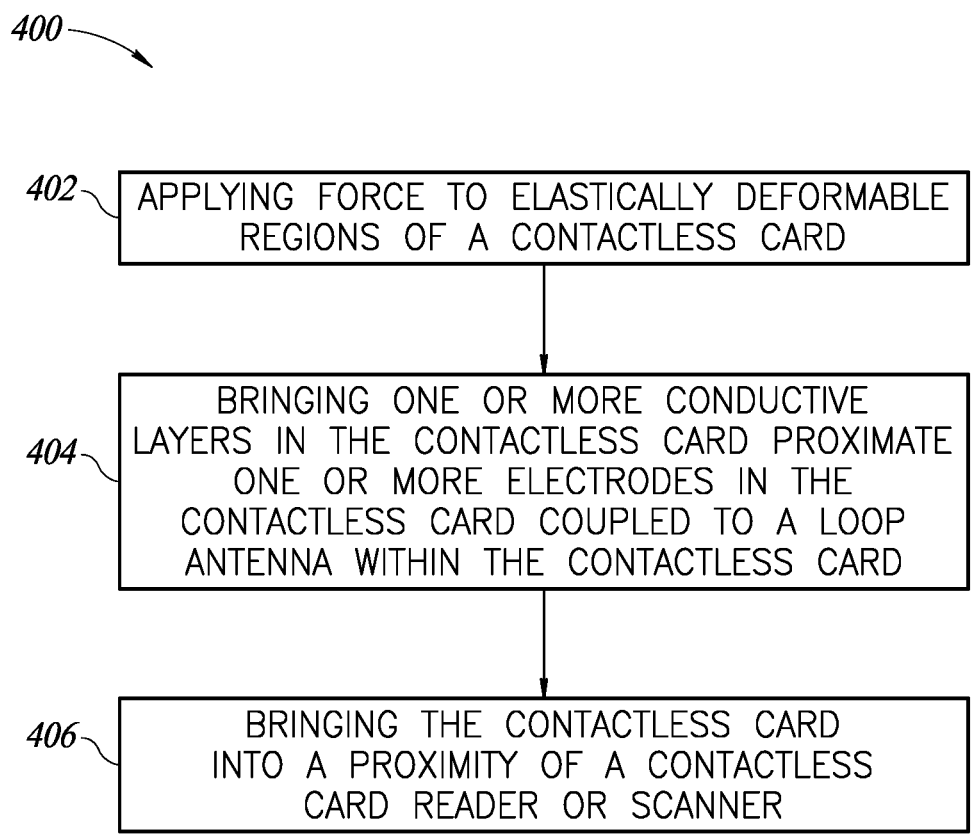
FIG. 4 is a block diagram of a method of utilizing the actuation structure of the contactless card as shown in FIGS. 1A-1D.

A block diagram 400 representing a method of actuating the actuation structure 122 is shown in FIG. 4. In a first step 402, an external force or pressure 176, 178 is applied to the first and second elastically deformable regions 156, 158 actuating or moving the second electrode 112 toward the second conductive layer 108 and vice versa.

As shown in FIG. 1D, in a second step 404 as the external force or pressure 176, 178 is increased, the surface 170 of the second conductive layer 108 physically comes into contact with the surface 170 of the second electrode 112 such that the second conductive layer 108 is electrically coupled to the second electrode 112. When the first and second elastically deformable regions 156, 158 are fully actuated due to the increasing external force or pressure 176, 178, the second conductive layer 108 is electrically coupled to the second electrode 112. Once the surfaces 168, 170 of the second conductive layer 108 and the second electrode 112 are in physical contact resulting in the second conductive layer 108 being electrically coupled to the second electrode 112, electrical signals may readily pass between the second conductive layer 108 and the second electrode 112, respectively. In some alternative situations, even if the surfaces 168, 170 do not physically contact, when the surfaces 168, 170 are brought within close enough proximity relative to each other, electrical signals may still readily be able to pass between the surfaces 168, 170 of the second electrode 112 and the second conductive layer 108, respectively, to transmit identification, authorization, and authentication information to a contactless card reader or scanner.

While the second conductive layer 108 and the second electrode 112 are actuated as discussed above, the first conductive layer 106 and the first electrode 110 are actuated simultaneously and in the same or similar fashion as the second conductive layer 108 and the second electrode 112. For simplicity and brevity sake of the present disclosure, the details of the relationship of the first conductive layer 106 and the first electrode 110 will not be discussed in further detail herein. Instead, it is readily apparent that the first conductive layer 106 and the first electrode 110 function in the same or similar manner as the second conductive layer 108 and the second electrode 112 as discussed herein.

In a third step 406, while continuing to apply the external force or pressure 176, 178 actuating the actuation structure 122, the contactless card 100 may be brought simultaneously proximate to a contactless card reader or scanner such that the contactless card reader or scanner may obtain identification, authorization, or authentication information through the antenna 124 from the contactless card 100. The contactless card reader or scanner may be an RFID scanner or reader that recognizes locations and identification of tagged items. The RFID scanner or reader may leverage low-power radio frequencies to collect and store data that may be passed along and through the antenna 124 either to or from the integrated circuit 102 of the contactless card 100. A transceiver within the RFID scanner or reader may receive and read radio frequencies transmitted from the contactless card 100 through the antenna 124 and a transmitter of the RFID scanner or reader may transmit radio frequencies to the contactless card 100 received by the antenna 124. This process may result in the identification, authentication, and authorization information being transmitted (e.g., broadcasted) from the integrated circuit 102 embedded in the contactless card 100 through the antenna 124 to the RFID scanner or reader. The RFID scanner or reader may then process the identification, authentication, or authorization information, which may result in unlocking a lock to gain access to an area with limited accessibility (e.g., cabin of a vehicle such as a car, airplane, boat, or some other like or similar vehicle, or a secure location with limited access such as a library, a laboratory, or some other like or similar type of location with limited access).

In an alternative embodiment of the method of the block diagram 400 as shown in FIG. 4, the third step 406 may occur before the first and second steps 402, 404. For example, the contactless card 100 may instead be brought proximate to the contactless card reader or scanner at which point the actuation structure 122 may be actuated by the owner by applying the external force or pressure 176, 178. For example, after being positioned within a sensing area or reading area of the contactless card scanner or reader, the actuation structure 122 is actuated. Once the actuation structure is actuated by first and second steps 402, 404 after the third step 406 has already been performed, the contactless card reader or scanner obtains the identification information (e.g., authentication information) on the integrated circuit 102 through the antenna 124, which is in electrical communication with the integrated circuit 102 when the actuation structure 122 is in the actuated position.

By having the first and second elastically deformable regions 156, 158 at the first and second surfaces 136, 138 of the contactless card 100, the likelihood of the contactless card 100 being actuated accidentally (e.g., unintended actuation) when in an owner's pocket is reduced as compared to if the contactless card 100 only included one of the first or second elastically deformable regions 156, 158. For example, the elastically deformable regions 156, 158 may both need to be actuated before the first and second electrodes 110, 112 become electrically coupled to the first and second conductive layers 106, 108, respectively. For example, if only the second elastically deformable region 158 was deformed, the first and second conductive layers 106, 108 may not be actuated far enough to electrically couple the first and second conductive layers 106, 108 to the first and second electrodes 110, 112. Similarly, if only the first elastically deformable region 156 was deformed, the first and second electrodes 110, 112 may not be actuated far enough to electrically couple the first and second electrodes 110, 112 to the first and second conductive layers 106, 108. This reduces the likelihood of the identification, authentication, or authorization information stored within the integrated circuit 102 being obtained by a thief who simply brings a contactless card reader or scanner in close proximity to the pocket of the owner containing the contactless card 100. Alternatively, the contactless card 100 may be present in an external pocket of a backpack, a fanny pack, a pouch, or some other type of apparel in which the owner carries and stores the contactless card 100.

By having the first and second elastically deformable regions 156, 158, the likelihood of the actuation structure 122 being actuated accidentally (e.g., unintended actuation) when present within a pocket of an owner is reduced as the external forces or pressures 176, 178 may need to be applied to both first surface 136 and the second surface 138 simultaneously. This simultaneous application of the external forces or pressures 176, 178 electrically couples the first and second conductive layers 106, 108 to the first and second electrodes 110, 112, respectively, by elastically deforming the first and second elastically deformable regions 156, 158. Whereas if only one elastically deformable region at either the first or second surface 136, 138 needed to be actuated to electrically couple the first and second conductive layers 106, 108 to the first and second electrodes 110, 112, the likelihood of accidental actuation may be increased as only one of the external forces or pressures 176, 178 would need to be applied to electrically couple the first and second conductive layers 106, 108 to the first and second electrodes 110, 112. Accordingly, utilizing a pair of opposite elastically deformable regions 156, 158 at the first and second surfaces 136, 138 of the contactless card 100 reduces the likelihood of accidental actuation of the actuation structure 122 making it increasingly more difficult for a thief to access the information stored on the contactless card 100 without permission or knowledge of the owner.

FIGS. 2A-2E are directed to an embodiment a method of manufacturing the contactless card 100 as shown in FIGS. 1A-1D. FIGS. 2A-2E are directed to cross-sections of various layers in the embodiment of the method of manufacturing the contactless card as shown in FIGS. 1A-1D taken along a line the same or similar to line 1B-1B as shown in FIG. 1A. While the following discussion focuses on forming only a single one of the contactless card 100, generally, multiples of the contactless card 100 may be formed in an array or pattern at which point each one of a plurality of the contactless cards 100 may be singulated from the array forming multiple individual ones of the contactless card 100 as shown in FIGS. 1A-1D.

Figure 2A:
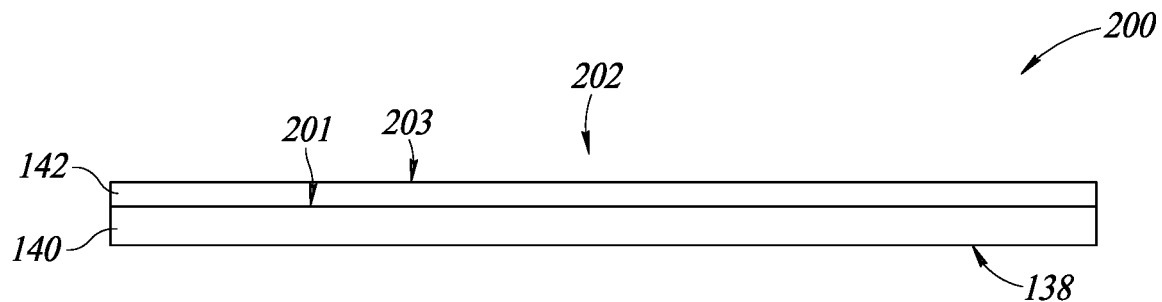
FIGS. 2A-2E are cross-sectional views directed to a method of manufacturing the embodiment of the contactless card as shown in FIGS. 1A-1D.

In a first step 200 as shown in FIG. 2A, the second layer 142 is formed on the first layer 140. The second layer 142 may completely cover a surface 201 of the first layer 140 on which the second layer 142 is formed. The second layer 142 may be formed on the first layer 140 by a lamination process in which the first layer 140 and the second layer 142 move around one or more rollers into a vacuum assembly bonding the first layer 140 to the second layer 142. In some embodiments, a bonding agent may be utilized to further adhere, couple, and laminate the first layer 140 to the second layer 142. A first stacked structure 202 is formed by adhering, coupling, and laminating the second layer 142 to the first layer 140.

After the first stacked structure 202 is formed, the third layer 144 is formed on a surface 203 of the second layer 142 facing away from the first layer 140 as shown in step 204. The third layer 144 may completely cover the surface 203 of the second layer 142 facing away from the first layer 140. The third layer 144 may be formed on the second layer 142 by a sputtering technique, a spin-on glass technique, an injection mold technique, a compression mold technique, or some other like or similar formation technique that may be utilized to form the third layer 144. In this embodiment, the third layer 144 may be made of a dielectric material, an insulating material, a non-conductive material, or some other like or similar type of non-electrically conductive material. The third layer 144 may be made of multiple layers of a dielectric material, an insulating material, a non-conductive material or some other like or similar type of non-electrically conductive material.

After the third layer 144 is formed on the second layer 142, the antenna 124, the first electrode 110, and the second electrode 112 are formed in the third layer 144. The antenna 124 may be formed in the third layer 144 by performing one or more patterning steps along with one or more conductive material formation steps consecutively and successively with each other. For example, openings may be patterned into the third layer 144 by forming one or more mask layers on a surface 205 of the third layer 144 facing away from the first and second layers 140, 142 followed by performing one or more etchings resulting in forming one or more openings and recesses extending into the surface 205 of the third layer 144. Either after or between steps of forming these openings by patterning the surface 205 of the third layer 144, one or more plating steps or conductive material formation steps may be performed consecutively and successively along with these one or more patterning steps to form the conductive material within the openings and recesses. The antenna 124, the first electrode 110, and the second electrode 112 are formed within the third layer 144 by performing these one or more plating steps successively and consecutively with the one or more patterning steps, which may be one or more etching steps in combination with one or more mask layer formation steps. The antenna 124 may be made of a copper material, a silver material, a gold material, a copper alloy material, a silver alloy material, a gold alloy material, or some other like or similar type of electrically conductive material. In some embodiments, the third layer 144 may be one or more passivation layers or repassivation layers that are stacked on each other and utilized to form the antenna 124, the first electrode 110, and the second electrode 112. The one or more patterning steps and the one or more plating steps may be carried out successively or consecutively to form the first, second, and third portions 130, 132, 134 of the antenna 124 at different levels within the third layer 144 such that the second and third portions 132, 134 may readily overlap the first portion 130 in the overlap region 128 as shown in FIG. 1A of the present disclosure.

Figure 2B:
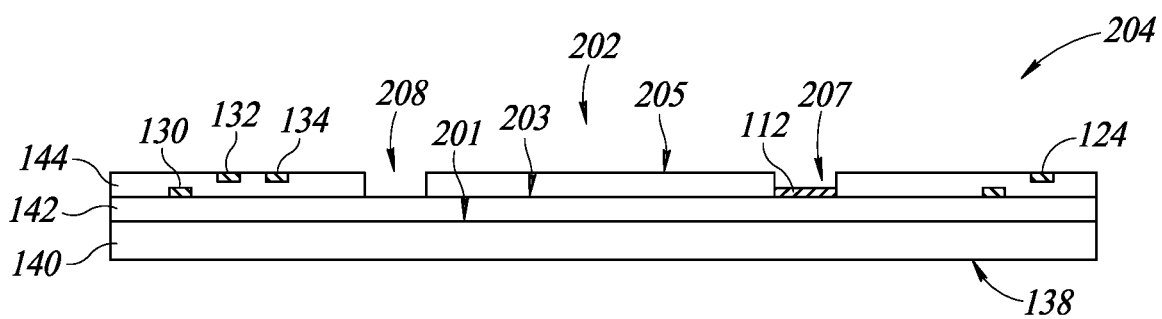

In the step 204 as shown in FIG. 2B, the second electrode 112 includes sidewalls, one of which is the side surface 152 as discussed above with respect to FIGS. 1A and 1B, that are covered by the third layer 144. The second electrode 112 further includes a surface 207 that is transverse to the sidewalls of the second electrode 112 and is exposed from the surface 205 of the third layer 144. The surface 207 of the second electrode 112 may be flush and substantially coplanar with the surface 205 of the third layer 144.

In step 204 as shown in FIG. 2B, an opening 208 is formed extending into the surface 205 of the third layer 144 to the surface 203 of the second layer 142. The opening 208 may correspond to the opening 154 as discussed with respect to FIG. 1B above. The opening 208 may be formed when performing the patterning steps (e.g., the combination of etchings and mask layer formation steps). In other words, the opening 208 may be formed along with the antenna 124, the first electrode 110, and the second electrode 112.

While not shown, the first electrode 110 has sidewalls and a surface like or similar to the sidewalls and the surface 207 of the second electrode 112, and the sidewalls and the surface of the first electrode 110 has like or similar relationships with the third layer 144 and the surface 205 of the third layer 144. Accordingly, for simplicity and brevity sake of the present disclosure, the discussion of these sidewalls and this surface of the first electrode 110 are not discussed in further detail herein. Instead, the relationships between these sidewalls and this surface of the first electrode 110 with respect to the third layer 144 and the surface 205 of the third layer 144 is readily apparent.

Figure 2C:
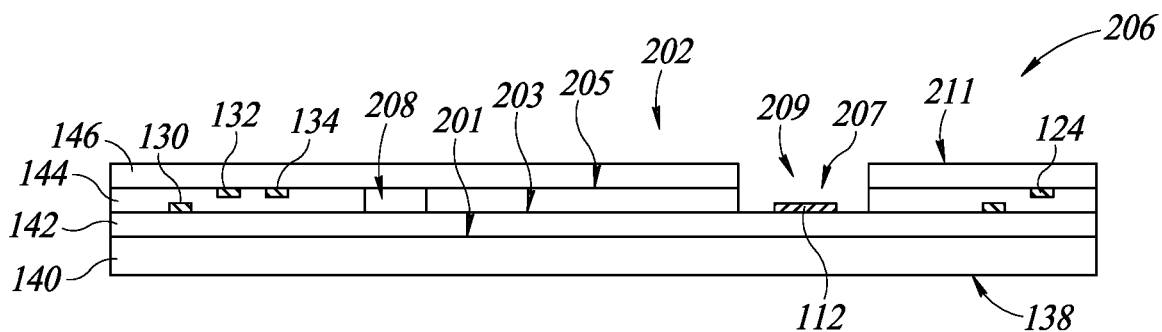

After the antenna 124 has been formed in the third layer 144, the fourth layer 146 is formed on the third layer 144. The fourth layer 146 may completely cover the surface 205 of the third layer 144. The fourth layer 146 may be formed on the third layer 144 by laminating the fourth layer 146 on the third layer 144 in the same or similar manner as the second layer 142 was laminated onto the first layer 140. For example, the fourth layer may be rolled out onto the surface 205 of the third layer 144 and then the first stacked structure 202 including the first, second, and third layer 140, 142, 144 with the fourth layer 146 on the third layer 144 may be moved through a vacuum assembly to adhere the fourth layer 146 to the third layer 144. After the fourth layer 146 is coupled to or adhered to the surface 205 of the third layer 144, an opening 209 is formed extending into a surface 211 of the fourth layer 146 to the surface 203 of the second layer 142 as shown in FIG. 2C in step 206. For example, in the step 206, the opening 209 may be formed by removing portions of the fourth layer 146 and the third layer 144 exposing a sub-region of the surface 203 of the second layer 142 and exposing the second electrode 112. These portions of the third and fourth layers 144, 146 may be removed by a patterning steps (e.g., combination of etchings and mask layer formation steps) the same or similar to those as discussed with respect to forming the antenna 124, the first electrode 110, and the second electrode 112. The opening 209 may also expose the first electrode 110 as well. Alternatively, in some other embodiments, another opening separate and distinct from the opening 209 may be formed to expose the first electrode 110. The separate and distinct opening may be separated from the opening 209 by a wall (not shown) of the third and fourth layers 203, 205, respectively, formed between the first and second electrodes 110, 112. The opening 209 corresponds to the cavity 150 as discussed above with respect to the contactless card 100 as shown in FIGS. 1A and 1B.

Figure 2D:
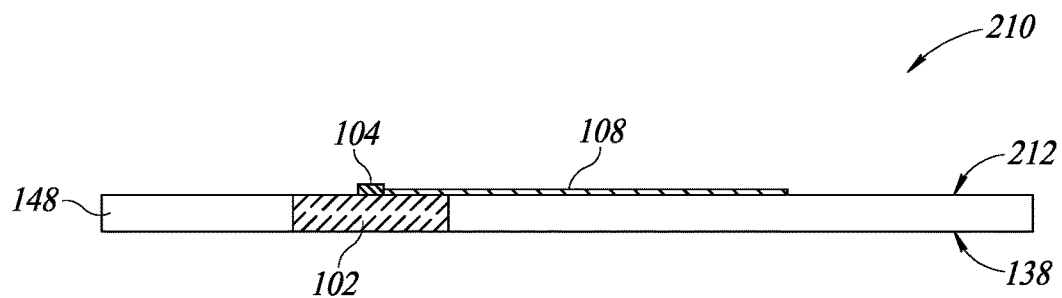
Figure 2E:
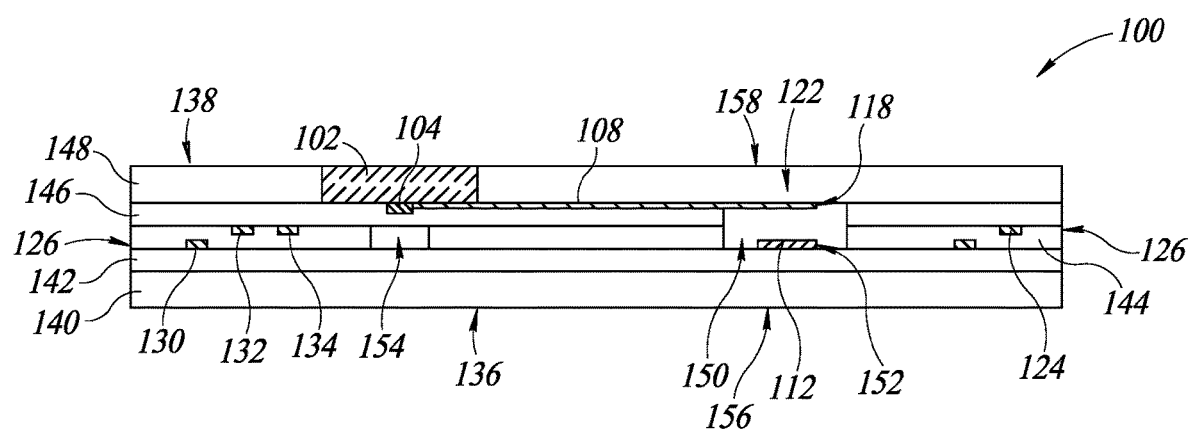

As shown in FIG. 2D, a second stacked structure 210 may be formed that is to be coupled to the first stacked structure 202. The second stacked structure 210 may be formed by first forming an opening in the fifth layer 148 and positioning the integrated circuit 102 within the opening of the fifth layer 148 such that the integrated circuit 102 is embedded and held within the fifth layer 148. After the integrated circuit 202 has been embedded within the fifth layer 148, the second conductive layer is formed on a surface 212 of the fifth layer 148 and is coupled to one of the one or more contacts 104 of the integrated circuit 102. It will be readily appreciated that the first conductive layer 106 may be formed in the same or similar manner as the second conductive layer 108 and may be formed simultaneously or consecutively with respect to forming the second conductive layer 108. The first conductive layer 106 is coupled to one of the one or more contacts 104 of the integrated circuit 102.

After the second stacked structure 210 is formed, the second stacked structure 210 is coupled to the first stacked structure 202 forming the contactless card 100. The surface 212 of the fifth layer 148 may be coupled to the surface 211 of the fourth layer 146. For example, the surface 212 of the fifth layer 148 may be positioned on the surface 211 of the fourth layer 146 by a pick and place machine such that the second end 118 of the second conductive layer 108 overlaps the opening 209. After the surface 212 of the fifth layer 148 is on the surface 211 of the fourth layer 146, the fourth and fifth layers 146, 148 may be exposed to a heat source and then passed through a vacuum assembly in a lamination process to laminate, adhere, and couple the second stacked structure 210 to the first stacked structure 202. A bonding agent may be utilized to adhere and couple the second stacked structure 210 to the first stacked structure 202. Once the second stacked structure 210 is laminated, adhered, and coupled to the first stacked structure 202, the contactless card 100 is formed.

Alternatively, when the contactless card 100 is one of an array of contactless cards that are all formed relatively at the same time with each other, the contactless card 100 may be singulated from the array of the contactless cards 100 by a cutting device. For example, when the contactless card 100 is singulated from the other ones in the array of contactless cards 100, the cutting device may form the sidewalls 126 of the contactless card 100 as shown in FIGS. 1A-1D and described above.

In an alternative embodiment of the method, the integrated circuit 102 may not be present in the second stacked structure 210, and, instead, the second stacked structure 210 may only include the first and second conductive layers 106, 108, respectively, on the surface 212 of the fifth layer 148. The stacked structure 210 including only the first and second conductive layers 106, 108 formed on the surface 212 of the fifth layer 148 is then coupled to the first stacked structure 202 in the same or similar manner as discussed above. After the second stacked structure 210 is coupled to the first stacked structure 202, an opening is formed in the second surface 138 of the fifth layer 148 extending to the fourth layer 146 and exposing respective ends of the first and second conductive layer 106, 108 opposite to the respective ends 114, 118 of the first and second conductive layers 106, 108, respectively, as shown in FIGS. 1A-1D. The integrated circuit 102 is then positioned within the opening, which again is exposing the respective ends of the first and second conductive layers 106, 108 opposite to the respective ends 114, 118 of the first and second conductive layers 106, 108, such that the one or more contacts 104 are coupled to the first and second conductive layers 106, 108, respectively. A bonding agent (e.g., a glue, a solder paste, a die attach film, etc.) may be formed in the opening and on the surface 211 of the fourth layer 146 such that the integrated circuit 102 is coupled to the fourth layer 146 and is held within the contactless card 100 while the one or more contacts 104 are coupled to the first and second conductive layers 106, 108, respectively. This alternative embodiment of the method of manufacturing the contactless card 100 may be utilized in forming an array of the contactless cards 100 that are singulated from each other by a cutting device forming the sidewalls 126 of the contactless card 100.

In the above discussed method, bonding agents may be utilized to adhere the first, second, third, fourth, and fifth layers 140, 142, 144, 146, 148 together to improve robustness and strength of adhesion between the first, second, third, fourth, and fifth layers 140, 142, 144, 146, 148.

While the above method in FIGS. 2A-2E is at least one embodiment of a method of forming the contactless card 100 as shown in FIGS. 1A-1D, it will be readily appreciated that a person of ordinary skill in the art may utilize other formation processes known to the contactless card manufacturing industry to form the contactless card 100 with the actuation structure 122. It will also be readily appreciated that the above steps may be reorganized to form the contactless card 100 in alternative methods of forming the contactless card 100.

Figure 3:
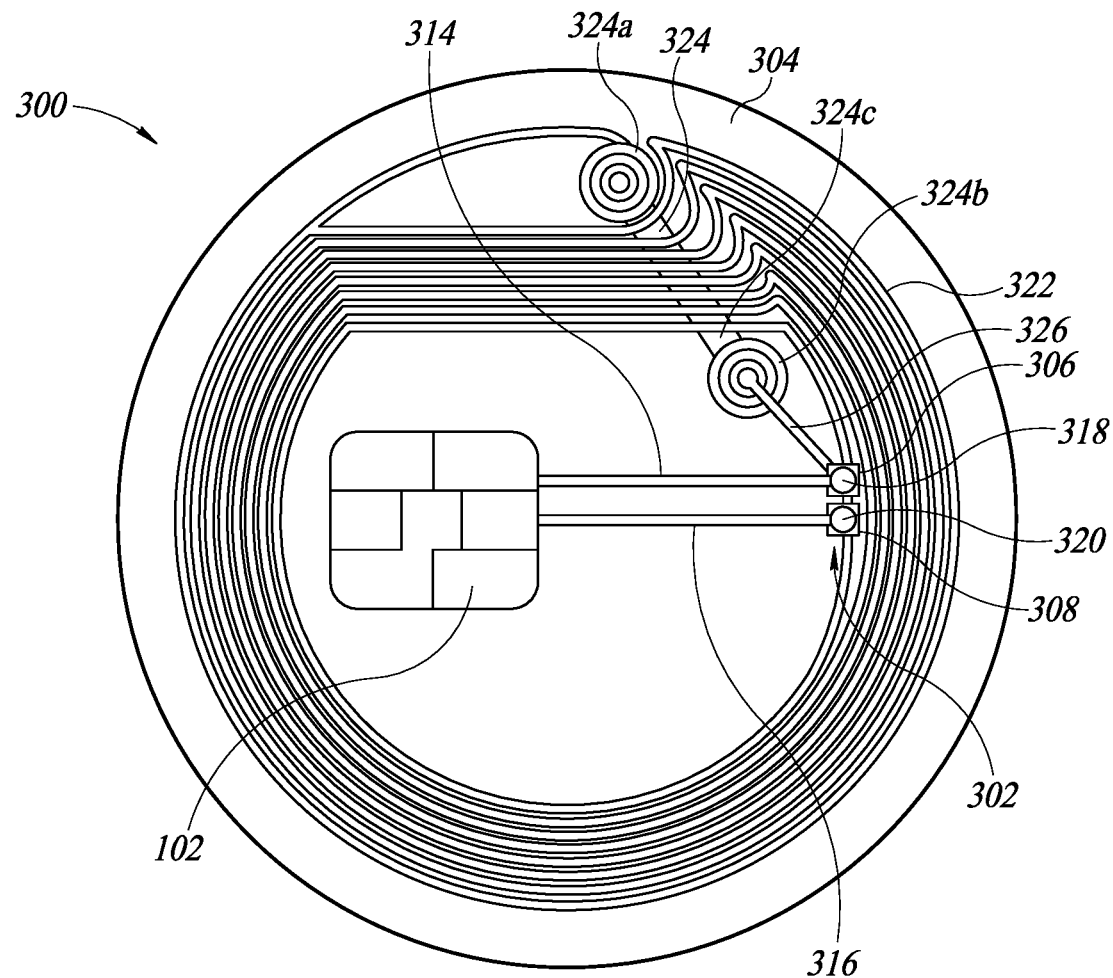
FIG. 3 is a top plan view of an embodiment of a contactless device with an embodiment of a contactless structure of the present disclosure.

FIG. 3 is directed to an embodiment of a security device 300 including an actuation structure 302, which is the same or similar to the actuation structure 122 as discussed above with respect to the contactless card 100 as shown in FIGS. 1A-1D. The security device 300 may be a security fob, a security tile, or some other like or similar security device that may receive or transmit signals to and from a contactless reader or scanner when the actuation structure 302 is actuated and while the security device 300 is present within a sensing or reading area of the contactless reader or scanner. In other words, the method as shown in the block diagram 400 of FIG. 4 and discussed above may be followed to obtain access to an area with limited accessibility (e.g., cabin of a vehicle such as a car, airplane, boat, or some other like or similar vehicle; or a secure location with limited access such as a library, a laboratory, or some other like or similar type of location with limited access) utilizing the security device 300 in the same or similar manner as the contactless card 100.

The actuation structure 302 of the security device 300 may be in an elastically deformable substrate 304 that may be elastically deformable in the same or similar manner to the first and second elastically deformable regions 156, 158 as discussed above with respect to the contactless card 100 as shown in FIGS. 1A-1D. The elastically deformable substrate 304 may be a multilayer structure including a plurality of stacked layers that are the same or similar to the first, second, third, fourth, and fifth layers 140, 142, 144, 146, 148 as shown in FIG. 1B of the contactless card 100 of the present disclosure. Alternatively, the elastically deformable substrate 304 may include less than or more than the five layers 140, 142, 144, 146, 148 as shown in FIG. 1B of the present disclosure.

Unlike the contactless card 100, the security device 300 may be positioned within a housing (not shown) that may include elastically deformable regions aligned with elastically deformable regions of the elastically deformable substrate 304 all of which overlap and are aligned with the actuation structure 302. An owner of the security device 300 may apply external forces or pressures in the same or similar manner as the external forces or pressures 176, 178 as shown in FIG. 1D to the respective elastically deformable regions of the housing and the elastically deformable substrate 304 resulting in elastic deformation and actuation of the actuation structure 302. In other words, the actuation structure 302 is actuated in the same or similar manner as the actuation structure 122 of the contactless card 100, however, unlike actuating the contactless card 100, the external forces or pressures may be applied to external surfaces of the housing at which the elastically deformable regions of the housing are present instead of applying the external forces or pressures to surfaces of the elastically deformable substrate 304 directly by fingers of the owner.

The actuation structure 302 includes a first electrode 306 and a second electrode 308 that are spaced apart from each other. The first electrode 306 may be the same or similar to the first electrode 110 of the contactless card 100, and the second electrode 308 may be the same or similar to the second electrode 112 of the contactless card 100. The actuation structure 302 further includes a first conductive layer 314 and a second conductive layer 316 spaced apart from each other and having respective ends 318, 320 overlapping the first and second electrodes 306, 308, respectively. The first conductive layer 314 may be the same or similar to the first conductive layer 106 of the contactless card 100, and the second conductive layer 316 may be the same or similar to the second conductive layer 108 of the contactless card 100.

The first conductive layer 314 includes a first end 318 that is aligned with and overlaps the first electrode 306, and the second conductive layer 316 includes a second end 320 that is aligned with and overlaps the second electrode 308. The first and second ends 318, 320 are circular in shape at least when viewed in the orientation as depicted in FIG. 3. The first end 318 is the same or similar to the first end 114 of the first conductive layer 106 of the contactless card 100, and the second end 320 is the same or similar to the second end 118 of the second conductive layer 108 of the contactless card 100. For example, when the housing and the elastically deformable substrate 304 are elastically deformed inward, the first and second ends 318, 320 become electrically coupled to the first and second electrodes 306, 308, respectively, such that the integrated circuit 102 is electrically in communication with an antenna 322 through the actuation structure 302.

The antenna 322 may be the same or similar to the antenna 124 in the contactless card 100. However, in this embodiment of the security device 300, the antenna 322 is more circular relative to the antenna 124 (e.g., rectangular in shape) in the embodiment of the contactless card 100 as shown in FIGS. 1A-1D. The antenna 322 includes several more loops that loop around the integrated circuit 102 and the actuation structure 302 relative to the antenna 124 of the contactless card 100 as shown in FIGS. 1A-1D.

The loops of the antenna 322 may be in close enough proximity relative to each other such that, when an electrical signal passes through the antenna 322, the loops are in electrical communication with each other such that the electrical signal passes through and along all of the loops of the antenna 322. In an alternative embodiment, the loops of the antenna 322 may be coupled together by a plurality of electrical connections such as a plurality of solder connections, a plurality of wire bond connections, or a plurality of some other type of electrical connections along which an electrical signal may readily be communicated.

An electrical connection structure 324 is coupled to an end of the antenna 322 whereas an opposite end of the antenna 322 is coupled to the second electrode 308. The electrical connection structure 324 includes a first connection end 324a coupled to a second connection end 324b by a connection pathway 324c that extends from the first connection end 324a to the second connection end 324b. A third conductive layer 326 couples the second connection end 324b to the first electrode 306. The first and second connection ends 324a, 324b may be conductive pillar structures that extend into the elastically deformable substrate 304 such that the loops of the antenna 322 may readily overlap and pass over the connection pathway 324c between the first connection end 324a and the second connection end 324b. In other words, the connection pathway 324c is on a different level than the loops of the antenna 322 such that the loops of the antenna 322 may readily overlap and extend across the connection pathway 324c without physically contacting the connection pathway 324c. This overlapping of the loops of the antenna 322 with the connection pathway 324c is the same or similar to the first portion 130 of the antenna 124 being overlapped by the second and third portions 132, 134 of the antenna 124 in the overlap region 128.

The contactless card 100 and the security device 300 as described herein may be utilized as a security devices/cards and authentication devices/cards to access a secure location to which the owner of the contactless card 100 or the security device 300 is authorized to access while limiting others individuals without permission or authentication from accessing those secure location. For example, this secure location may be a cabin of vehicle (e.g., a car, a truck, an airplane, a boat, etc.), may be a secure facility (e.g., laboratory, library, secure facility, etc.), or may be some other like or similar type of area allowing the owner to access the secure location while preventing other individuals who do not have authorization from accessing those secure locations. For example, a contactless card reader or scanner may be present within or proximate a handle of a car door, and the owner of the car may unlock the car door by utilizing the contactless card 100. For example, the owner may actuate the contactless card 100 proximate to the contactless card reader (e.g., within a sensing or reading area of the contactless card reader) resulting in the car door being unlocked such that the owner of the car may access the cabin of the car through the unlocked car door.

While the above discussion herein focuses on the contactless card 100 and the security device 300, the above actuation structures 122, 302 herein may readily be utilized in other types of access or security devices to allow access to secure locations by the owner while preventing access by individuals who do not have authorization to access the secure location. For example, a thief trying to enter a cabin of a vehicle to steal items present within the cabin of the vehicle, a thief trying to access a locked door such as at a pharmaceutical clinic, or some other secure location in which access is only allowed by authorized individuals.

In view of the above discussion, the embodiment of the actuation structure 122 in the contactless card 100, which may be a smartcard, and the security device 300 may be implemented in other similar or like types of security structures or devices. For example, the actuation structure 122 may be incorporated into an RFID tag (e.g., flexible tag form factor), an RFID integrated circuit, a secure microcontroller (MCU) integrated circuit (e.g., another type of smartcard integrated circuit), or some other similar or like type of circuit or integrated circuit within a security structure or device. In other words, the actuation structure 122 may be implemented in any number of security structures or devices to improve security by blocking access to functionality of circuits within the security structures or devices when there is no mechanical actuation of the actuation structure 122 reducing the likelihood of unauthorized access to the functionality of the security device or structure, or unauthorized access to information on the security device or structure.

A device may be summarized as including a first non-conductive layer, a second non-conductive layer on the first non-conductive layer, a third non-conductive layer on the second non-conductive layer, a fourth non-conductive layer on the third non-conductive layer, and a fifth non-conductive layer on the fourth non-conductive layer; a loop antenna within the third non-conductive layer and on the second non-conductive layer, the loop antenna including one or more surfaces that are exposed from the third non-conductive layer and covered by the fourth non-conductive layer; an integrated circuit device in the fifth non-conductive layer including a first and a second contact; one or more spaces extending through the third and fourth non-conductive layers spaced apart from the integrated circuit device; a first and a second electrode each in one of the one or more spaces and coupled to the loop antenna; a first conductive layer coupled to the first contact including a first end in one of the one or more spaces, the first end overlapping the first electrode; and a second conductive layer coupled to the second contact including a second end in one of the one or more spaces, the second end overlapping the second electrode, wherein the first end, the second end, the first electrode, and the second electrode include: a resting state in which the first end and the second end are electrically isolated from the first electrode and the second electrode, respectively; and an actuated state in which the first end and the second end are in electrical communication with the first electrode and the second electrode, respectively.

The first non-conductive layer may have a first thickness. The second non-conductive layer may have a second thickness. The third non-conductive layer may have a third thickness. The fourth non-conductive layer may have a fourth thickness. The fifth non-conductive layer may have a fifth thickness. The first and fifth thicknesses may be greater than the second, third, and fourth thicknesses.

The cavity may be an air cavity containing of the first electrode and the second electrode and the first end and the second end of the first and second conductive layers, respectively.

The first end and the second end may be on an inner surface of the fifth non-conductive layer facing respective surfaces of the first and second electrodes.

In use, the first non-conductive layer may move towards the fifth non-conductive layer and the fifth non-conductive layer may move towards the first non-conductive layer when actuating the first and second ends and the first and second electrodes from the resting state to the actuated state; and in use, the first non-conductive layer may move away from the fifth non-conductive layer and the fifth non-conductive layer may move away from the first non-conductive layer when actuating the first and second ends of the first and second electrodes from the actuated state from the resting state.

The first and second ends, in use, may be actuated in a first direction, which is directed from the fifth non-conductive layer towards the first non-conductive layer, towards the first and second electrodes, and away from the resting state towards the actuated state. The first and second electrodes, in use, may be actuated in a second direction, which is directed from the first non-conductive layer towards the fifth non-conductive layer, towards the first and second ends, and away from the resting state towards the actuated state.

In use, when the first and second ends and the first and second electrodes are in the actuated states, each of the first and second ends may be in electrical communication with a corresponding one of the first and second electrodes electrically coupling the integrated circuit die to the loop antenna.

In use, when the first and second ends and the first and second electrodes are in the actuated state, the first and second ends may physically abut a corresponding one of the first and second electrodes, respectively.

A method may be summarized as including applying a first force to a first side of a smart card in a first direction extending from a first side of the smart card towards a second side of the smart card opposite to the first side, and applying the first force includes: moving a first end of a first conductive layer towards a first electrode within the smart card in the first direction from a first position to a second position of the first end; and moving a second end of a second conductive layer towards a second electrode within the smart card in the first direction from a first position to a second position of the second end. Applying a second force to the second side of the smart card in a second direction extending from the second side towards the first side and is opposite to the first direction, and applying the second force includes: moving the first electrode towards the first end within the smart card in the second direction from a first position to a second position of the first electrode; and moving the second electrode towards the second end within the smart card in the second direction from a first position to a second position of the second electrode.

Applying the first force to the first side and applying the second force to the second side may occur substantially simultaneously.

Moving the first end in the first direction may move the first end towards the first electrode; moving the first end towards the first electrode in the first direction and moving the first electrode towards the first end in the second direction may bring the first end and the first electrode proximate to each other electrically coupling the first end to the first electrode; moving the second end in the first direction may move the second end towards the second electrode; and moving the second end towards the second electrode in the first direction and moving the second electrode towards the second end in the second direction may bring the second end and the second electrode proximate to each other electrically coupling the second end to the second electrode.

Moving the first end, the second end, the first electrode, and the second electrode to the second positions, respectively, may result in an integrated circuit device within the smart card being in electrical communication with a loop antenna within the smart card.

Moving the first end, the second end, the first electrode, and the second electrode to the second positions, respectively, may result in an integrated circuit device within the smart card being in electrical communication with a loop antenna within the smart card.

A device may be summarized as including a stack of non-conductive layers having a first external surface and a second external surface opposite to the first external surface; an integrated circuit device within the stack of non-conductive layers including a surface exposed from the stack of non-conductive layers at the first external surface; a loop antenna within the stack of non-conductive layers around the integrated circuit device; a cavity enclosed and delimited by respective layers of the stack of non-conductive layers and spaced apart from the integrated circuit device; a first elastically deformable region overlapping the cavity is at the first external surface, and is elastically deformable inwards towards the second external surface; a second elastically deformable region overlapping the cavity is at the second external surface, and is elastically deformable inwards towards the first external surface; a first conductive layer coupled to the integrated circuit device and extends away from the integrated circuit device to the cavity, the first conductive layer having a first end at the first elastically deformable region and in the cavity; a second conductive layer is coupled to the integrated circuit device and extends away from the integrated circuit device to the cavity, the second conductive layer having a second end at the second elastically deformable region and in the cavity; a first electrode at the second elastically deformable region, is in the cavity and coupled to the loop antenna; and a second electrode at the second elastically deformable region is in the cavity and coupled to the loop antenna.

The first and second ends, respectively, of the first and second conductive layers, respectively, may be configured to move with the first elastically deformable region; and the first electrode and the second electrode may be configured to move with the second elastically deformable region.

The cavity may be an air gap that contains air.

The integrated circuit device may be a radio-frequency identification device (RFID), a smartcard device, or a secure MCU (microcontroller unit) device.

The first elastically deformable region may overlap the second elastically deformable region.

The first elastically deformable region may be elastically deformable inwards in a first direction directed from the first external surface towards the second external surface; and the second elastically deformable region may be elastically deformable inwards in a second direction directed from the second external surface towards the first external surface, the second direction being opposite to the first direction.

The first elastically deformable region may include a resting position and an elastically deformed position; the second elastically deformable region may include a resting position and an elastically deformed position; the first elastically deformable region may be further away from the second elastically deformable region when the first and second elastically deformable regions are in the resting positions, respectively, of the first and second elastically deformable regions; and the first elastically deformable region may be closer to the second elastically deformable region when the first and second elastically deformable regions are in the deformed positions, respectively, of the first and second elastically deformable regions.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first non-conductive layer, a second non-conductive layer on the first non-conductive layer, a third non-conductive layer on the second non-conductive layer, a fourth non-conductive layer on the third non-conductive layer, and a fifth non-conductive layer on the fourth non-conductive layer;
a loop antenna within the third non-conductive layer and on the second non-conductive layer, the loop antenna including one or more surfaces that are exposed from the third non-conductive layer and covered by the fourth non-conductive layer;
an integrated circuit device in the fifth non-conductive layer including a first and a second contact;
one or more spaces extending through the third and fourth non-conductive layers spaced apart from the integrated circuit device;
a first and a second electrode each in one of the one or more spaces and coupled to the loop antenna;
a first conductive layer coupled to the first contact including a first end in one of the one or more spaces, the first end overlapping the first electrode; and
a second conductive layer coupled to the second contact including a second end in one of the one or more spaces, the second end overlapping the second electrode,
wherein the first end, the second end, the first electrode, and the second electrode include:
a resting state in which the first end and the second end are electrically isolated from the first electrode and the second electrode, respectively; and
an actuated state in which the first end and the second end are in electrical communication with the first electrode and the second electrode, respectively.

2. The device of claim 1, wherein:
the first non-conductive layer has a first thickness;
the second non-conductive layer has a second thickness;
the third non-conductive layer has a third thickness;
the fourth non-conductive layer has a fourth thickness;
the fifth non-conductive layer has a fifth thickness; and
the first and fifth thicknesses are greater than the second, third, and fourth thicknesses.

3. The device of claim 1, wherein the one or more spaces includes an air cavity containing the first electrode and the second electrode and the first end and the second end of the first and second conductive layers, respectively.

4. The device of claim 1, wherein the first end and the second end are on an inner surface of the fifth non-conductive layer facing respective surfaces of the first and second electrodes.

5. The device of claim 1, wherein:
in use, the first non-conductive layer moves towards the fifth non-conductive layer and the fifth non-conductive layer moves towards the first non-conductive layer when actuating the first and second ends and the first and second electrodes from the resting state to the actuated state; and
in use, the first non-conductive layer moves away from the fifth non-conductive layer and the fifth non-conductive layer moves away from the first non-conductive layer when actuating the first and second ends of the first and second electrodes from the actuated state from the resting state.

6. The device of claim 5, wherein:
the first and second ends, in use, are actuated in a first direction, which is directed from the fifth non-conductive layer towards the first non-conductive layer, towards the first and second electrodes, and away from the resting state towards the actuated state; and
the first and second electrodes, in use, are actuated in a second direction, which is directed from the first non-conductive layer towards the fifth non-conductive layer, towards the first and second ends, and away from the resting state towards the actuated state.

7. The device of claim 6, wherein, in use, when the first and second ends and the first and second electrodes are in the actuated states, each of the first and second ends are in electrical communication with a corresponding one of the first and second electrodes electrically coupling the integrated circuit die to the loop antenna.

8. The device of claim 1, wherein, in use, when the first and second ends and the first and second electrodes are in the actuated state, the first and second ends physically abut a corresponding one of the first and second electrodes, respectively.

9. A method, comprising:
applying a first force to a first side of a smart card in a first direction extending from a first side of the smart card towards a second side of the smart card opposite to the first side, and applying the first force includes:
moving a first end of a first conductive layer towards a first electrode within the smart card in the first direction from a first position to a second position of the first end; and
moving a second end of a second conductive layer towards a second electrode within the smart card in the first direction from a first position to a second position of the second end; and
applying a second force to the second side of the smart card in a second direction extending from the second side towards the first side and is opposite to the first direction, and applying the second force includes:
moving the first electrode towards the first end within the smart card in the second direction from a first position to a second position of the first electrode; and
moving the second electrode towards the second end within the smart card in the second direction from a first position to a second position of the second electrode.

10. The method of claim 9, wherein applying the first force to the first side and applying the second force to the second side occurs substantially simultaneously.

11. The method of claim 9, wherein:
moving the first end in the first direction moves the first end towards the first electrode;
moving the first end towards the first electrode in the first direction and moving the first electrode towards the first end in the second direction brings the first end and the first electrode proximate to each other electrically coupling the first end to the first electrode;
moving the second end in the first direction moves the second end towards the second electrode; and
moving the second end towards the second electrode in the first direction and moving the second electrode towards the second end in the second direction brings the second end and the second electrode proximate to each other electrically coupling the second end to the second electrode.

12. The method of claim 11, wherein moving the first end, the second end, the first electrode, and the second electrode to the second positions, respectively, results in an integrated circuit device within the smart card being in electrical communication with a loop antenna within the smart card.

13. The method of claim 9, wherein moving the first end, the second end, the first electrode, and the second electrode to the second positions, respectively, results in an integrated circuit device within the smart card being in electrical communication with a loop antenna within the smart card.

14. A device, comprising:
a stack of non-conductive layers having a first external surface and a second external surface opposite to the first external surface;
an integrated circuit device within the stack of non-conductive layers including a surface exposed from the stack of non-conductive layers at the first external surface;
a loop antenna within the stack of non-conductive layers around the integrated circuit device;
a cavity enclosed and delimited by respective layers of the stack of non-conductive layers and spaced apart from the integrated circuit device;
a first elastically deformable region overlapping the cavity is at the first external surface, and is elastically deformable inwards towards the second external surface;
a second elastically deformable region overlapping the cavity is at the second external surface, and is elastically deformable inwards towards the first external surface;
a first conductive layer is coupled to the integrated circuit device and extends away from the integrated circuit device to the cavity, the first conductive layer having a first end at the first elastically deformable region and in the cavity;
a second conductive layer is coupled to the integrated circuit device and extends away from the integrated circuit device to the cavity, the second conductive layer having a second end at the second elastically deformable region and in the cavity;
a first electrode at the second elastically deformable region, is in the cavity and coupled to the loop antenna; and
a second electrode at the second elastically deformable region is in the cavity and coupled to the loop antenna.

15. The device of claim 14, wherein:
the first and second ends, respectively, of the first and second conductive layers, respectively, are configured to move with the first elastically deformable region; and
the first electrode and the second electrode are configured to move with the second elastically deformable region.

16. The device of claim 14, wherein the cavity is an air gap that contains air.

17. The device of claim 14, wherein the integrated circuit device is at least one of a radio-frequency identification device (RFID), a smartcard device, and a secure microcontroller unit (MCU) device.

18. The device of claim 14, wherein the first elastically deformable region overlaps the second elastically deformable region.

19. The device of claim 14, wherein:
the first elastically deformable region is elastically deformable inwards in a first direction directed from the first external surface towards the second external surface; and
the second elastically deformable region is elastically deformable inwards in a second direction directed from the second external surface towards the first external surface, the second direction being opposite to the first direction.

20. The device of claim 19, wherein:
the first elastically deformable region includes a resting position and an elastically deformed position;
the second elastically deformable region includes a resting position and an elastically deformed position;
the first elastically deformable region is further away from the second elastically deformable region when the first and second elastically deformable regions are in the resting positions, respectively, of the first and second elastically deformable regions; and
the first elastically deformable region is closer to the second elastically deformable region when the first and second elastically deformable regions are in the deformed positions, respectively, of the first and second elastically deformable regions.

* * * * *